(12) United States Patent
Leverett et al.

(10) Patent No.: US 6,873,129 B1
(45) Date of Patent: Mar. 29, 2005

(54) METHOD OF CONTROLLING ROTATIONAL VELOCITY OF A ROTATABLE MEMBER DURING ENCODER INITIALIZATION FOR AN IMAGING APPARATUS

(75) Inventors: Daniel Aaron Leverett, Lexington, KY (US); John Thomas Writt, Lexington, KY (US)

(73) Assignee: Lexmark International Inc., Lexington, KY (US)

( * ) Notice: Subject to any disclaimer, the term of this patent is extended or adjusted under 35 U.S.C. 154(b) by 0 days.

(21) Appl. No.: 10/737,547

(22) Filed: Dec. 16, 2003

(51) Int. Cl.[7] .............................................. G05B 19/33
(52) U.S. Cl. ...................... 318/605; 318/618; 318/640; 318/602
(58) Field of Search ................................ 318/430, 431, 318/560, 600–605, 615–618, 621, 629, 632, 637, 638, 640

(56) References Cited

U.S. PATENT DOCUMENTS

| | | | |
|---|---|---|---|
| 4,042,973 A | 8/1977 | Caulfield et al. | |
| 4,319,188 A | * 3/1982 | Ito et al. ...................... | 324/173 |
| 4,475,034 A | 10/1984 | Maddox et al. | |
| 4,523,224 A | * 6/1985 | Longacre, Jr. .............. | 348/269 |
| 4,540,928 A | 9/1985 | Marhoefer | |
| 4,649,267 A | 3/1987 | Ray | |
| 4,926,104 A | 5/1990 | King et al. | |
| 4,954,863 A | * 9/1990 | Harada et al. ................ | 355/51 |
| 4,999,558 A | 3/1991 | Onodera et al. | |
| 5,015,836 A | 5/1991 | Van Antwerp | |
| 5,075,540 A | 12/1991 | Taniguchi et al. | |
| 5,433,541 A | 7/1995 | Hieda et al. | |
| 5,479,556 A | * 12/1995 | Oh .............................. | 388/805 |
| 5,598,201 A | 1/1997 | Stodder et al. | |
| 5,663,624 A | 9/1997 | Callaway | |
| 5,666,034 A | 9/1997 | Seoung et al. | |
| 5,783,924 A | * 7/1998 | Kahlman ..................... | 318/601 |
| 5,796,231 A | * 8/1998 | Kyodo ......................... | 318/608 |
| 5,825,378 A | 10/1998 | Beauchamp | |
| 5,844,394 A | 12/1998 | Mushika et al. | |
| 5,979,311 A | 11/1999 | Kakurai et al. | |
| 6,084,234 A | 7/2000 | Stridsberg | |
| 6,111,384 A | 8/2000 | Stagnitto | |
| 6,137,592 A | 10/2000 | Arquilevich et al. | |
| 6,191,415 B1 | 2/2001 | Stridsberg | |
| 6,292,117 B1 | 9/2001 | Smith | |
| 6,304,825 B1 | 10/2001 | Nowak et al. | |
| 6,421,581 B1 | 7/2002 | Hamamoto et al. | |
| 6,428,224 B1 | 8/2002 | Askren et al. | |
| 6,452,512 B1 | 9/2002 | Adkins et al. | |
| 6,515,445 B2 | 2/2003 | Shoji et al. | |
| 6,525,502 B1 | 2/2003 | Piedl et al. | |
| 6,555,985 B1 | 4/2003 | Kawabata et al. | |
| 6,567,015 B2 | 5/2003 | Adkins et al. | |
| 6,580,244 B2 | 6/2003 | Tanaka et al. | |
| 2003/0043250 A1 | 3/2003 | Askren et al. | |
| 2003/0067108 A1 | 4/2003 | Marra, III et al. | |

* cited by examiner

*Primary Examiner*—Bentsu Ro
(74) *Attorney, Agent, or Firm*—Taylor & Aust, PC (57) ABSTRACT

A method of controlling a rotational velocity of a rotatable member during initialization of an analog encoder unit that generates a channel A signal and a channel B signal, includes the steps of processing the channel A signal and the channel B signal to generate a feedback signal, an integrity of the feedback signal being maintained even if only one of the channel A signal and channel B signal is functional; and controlling the rotational velocity of the rotatable member during the initialization of the analog encoder unit based on the feedback signal generated by processing the channel A signal and the channel B signal.

18 Claims, 6 Drawing Sheets

METHOD OF CONTROLLING ROTATIONAL VELOCITY OF A ROTATABLE MEMBER DURING ENCODER INITIALIZATION FOR AN IMAGING APPARATUS

BACKGROUND OF THE INVENTION

1. Field of the Invention

The present invention relates to an imaging apparatus, and, more particularly, to controlling the rotational velocity of a rotatable member, such as for example a feed roller, during initialization of an encoder used in an imaging apparatus.

2. Description of the Related Art

An imaging apparatus in the form of an ink jet printer forms an image on a print media sheet by ejecting ink from a plurality of ink jetting nozzles of an ink jet printhead to form a pattern of ink dots on the print media sheet. Such an ink jet printer may include a reciprocating printhead carrier that transports multiple ink jet printheads across the print media sheet along a bi-directional scanning path defining a print zone of the printer. Typically, a mid-frame provides media support at or near the print zone. The imaging apparatus includes a sheet feeding mechanism, which is used to incrementally advance the print media sheet in a sheet feed direction. One such sheet feed mechanism includes, for example, a feed roller driven by an analog DC motor, and having an encoder coupled to the feed roller for rotation therewith. In order for the encoder to function properly, however, the encoder must be initialized.

One example of an encoder initialization procedure is set forth in U.S. Pat. No. 6,452,512 B1, which is incorporated herein in its entirety by reference. In general, an analog encoder has a light element, such as an LED, and two photo sensors, such as photo diodes, defining the channel A and channel B output channels of the analog encoder. In the case of a rotary encoder, such as would be used with a rotating printer feed roller, a rotatable disk having a windowed mask may be positioned between the light element and photo sensors, which when rotated results in output signals being present on the A and B channels of the analog encoder. The analog encoder includes amplification and offset circuitry for each of the A and B channels. It is desirable that the channel A and channel B encoder signals be produced with the same amplitude and in the same range. However, variances between electrical components and mechanical imperfections tend to cause the signals produced by the photo sensors to differ in amplitude and range. Thus, such as encoder system has two primary parameters that can be adjusted in attempting to control the characteristics of signals present on the A and B output channels of the analog encoder; namely, the energization level of the light element and the direct current (DC) offset of the A and B channels from the photo sensors.

Adjusting light source energization tends to primarily vary the amplitude of the encoder signals produced, while adjusting the DC offsets of the photo sensors tends to primarily vary the range within which the encoder signals are produced. In addition to the different results obtained by adjusting encoder light element energization as compared to adjusting DC offsets, the timing involved in implementing such adjustments tends to differ greatly.

It has been determined that one challenge to be overcome in initializing the analog encoder is the difficulty in maintaining an appropriate feed roller velocity during analog encoder initialization. For example, if the rotational velocity of the feed roller is too slow, then the analog encoder wheel may stall during initialization, resulting in incorrect signal measurements and a failed calibration. As a further example, if the rotational velocity of the feed roller is too fast, then aliasing effects may occur, or imperfections of the encoder wheel, such as for example, ink spots, may not be detected and compensated for, resulting in unacceptable encoder signals.

What is needed in the art is a method and apparatus that facilitates closed loop encoder initialization using the encoder signals generated by the analog encoder, thus providing the desired rotational velocity of a rotatable member, such as for example a feed roller, that is needed during encoder initialization.

SUMMARY OF THE INVENTION

The present invention provides a method and apparatus that facilitates closed loop encoder initialization using the encoder signals generated by the analog encoder, thus providing the desired rotational velocity of a rotatable member, such as for example a feed roller, that is needed during encoder initialization. As used herein, the term "rotational velocity" may refer to the surface velocity of the rotatable member, such as for example, in centimeters per second, or may refer to the number of revolutions of the rotatable member that occur during a given period of time, such as for example, revolutions per minute.

The invention, in one form thereof, is directed to a method of controlling a rotational velocity of a rotatable member during initialization of an analog encoder unit that generates a channel A signal and a channel B signal. The method includes the steps of processing the channel A signal and the channel B signal to generate a feedback signal, an integrity of the feedback signal being maintained even if only one of the channel A signal and channel B signal is functional; and controlling the rotational velocity of the rotatable member during the initialization of the analog encoder unit based on the feedback signal generated by processing the channel A signal and the channel B signal.

In another form thereof, the present invention is directed to a closed loop feedback system that controls a rotational velocity of a rotatable member driven by a drive unit during initialization of an analog encoder unit. The system includes an encoder reading circuit that forms part of the analog encoder unit. The encoder reading circuit is configured to generate a channel A signal and a channel B signal. A feedback circuit is coupled to the encoder reading circuit to receive the channel A signal and the channel B signal. The feedback circuit processes the channel A signal and the channel B signal to generate a feedback signal. A controller is coupled to the drive unit and to the feedback circuit. The controller controls the rotational velocity of the rotatable member via the drive unit during the initialization of the analog encoder unit based on the feedback signal generated from the channel A signal and the channel B signal.

In still another form thereof, the present invention is directed to an apparatus that controls a rotational velocity of a feed roller during initialization of an analog encoder unit. The apparatus includes a feed roller unit including the feed roller and a feed roller drive unit. An encoder wheel forms part of the analog encoder unit. The encoder wheel is connected to the feed roller for rotation with the feed roller. An encoder reading circuit forms part of the analog encoder unit. The encoder reading circuit is positioned to read the encoder wheel to generate a channel A signal and a channel B signal. A feedback circuit is coupled to the encoder reading circuit to receive the channel A signal and the channel B signal. The feedback circuit processes the channel A signal and the channel B signal to generate a feedback signal. A controller is coupled to each of the feed roller drive unit, the encoder reading circuit, and the feedback circuit. The controller controls the rotational velocity of the feed roller via the feed roller drive unit during the initialization of the analog encoder unit based on the feedback signal generated from the channel A signal and the channel B signal.

An advantage of the present invention is there are less encoder initialization failures.

Another advantage of the present invention is that the encoder unit is more robust to detecting ink spots and other contaminants on the encoder wheel and compensating for them.

Yet another advantage of the present invention is that the encoder initialization routine may be less complicated, such as for example, by the elimination of encoder wheel stall checks.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
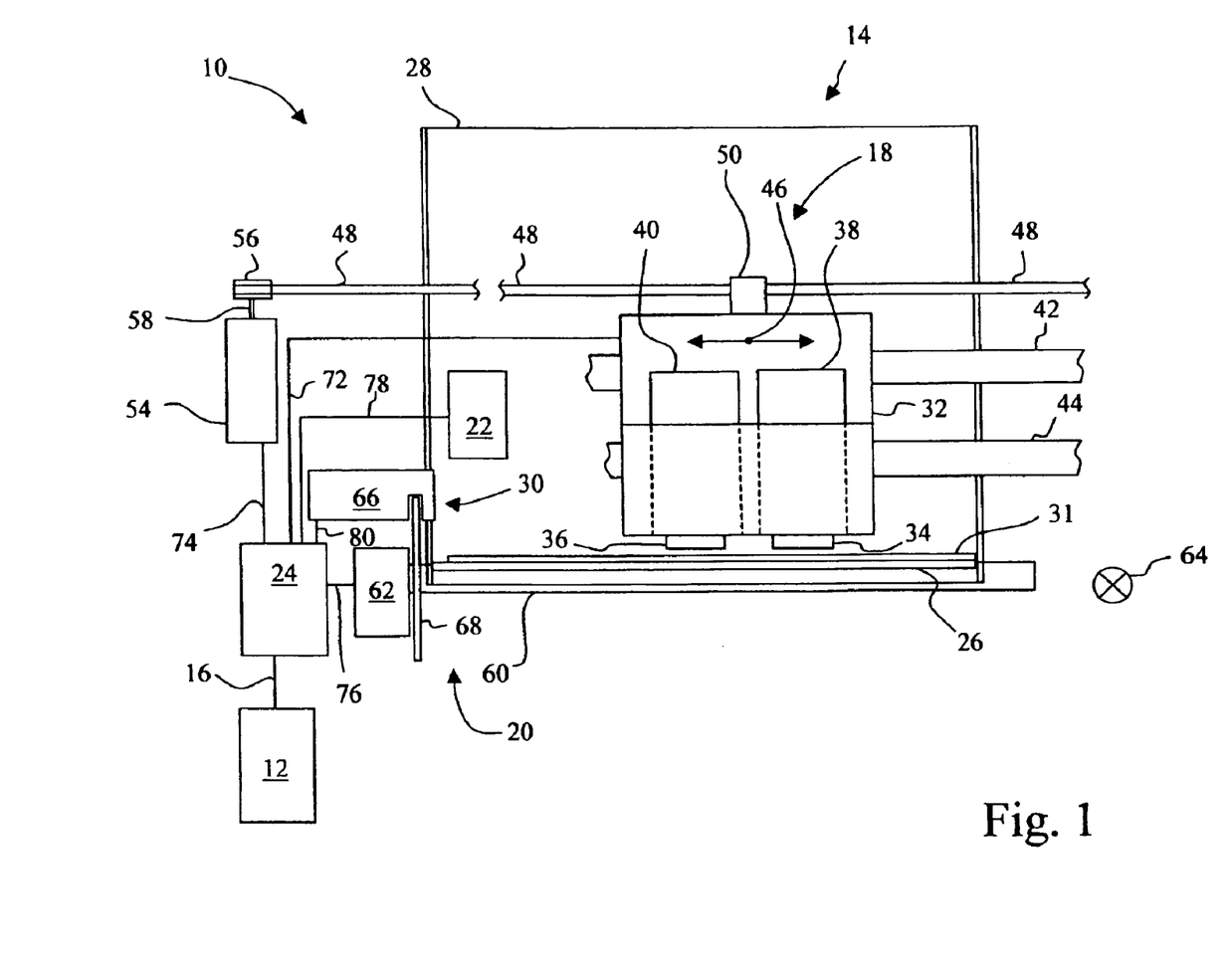
FIG. 1 is a diagrammatic representation of an imaging system embodying the present invention.

Referring now to the drawings, and particularly to FIG. 1, there is shown an imaging system 10 embodying the present invention. Imaging system 10 includes a host 12 and an imaging apparatus, in the form of an ink jet printer 14 as shown. Ink jet printer 14 may be a conventional ink jet printer, or may form the print engine for a multi-function apparatus, such as for example, a standalone unit that has faxing and copying capability, in addition to printing. Host 12, which may be optional, may be communicatively coupled to ink jet printer 14 via a communications link 16. Communications link 16 may be, for example, a direct electrical connection, a wireless connection, or a network connection.

Ink jet printer 14 includes a printhead carrier system 18, a feed roller unit 20, a sheet picking unit 22, a controller 24, a mid-frame 26, a media source 28, and an analog encoder unit 30.

In embodiments including host 12, host 12 may be, for example, a personal computer including a display device, an input device (e.g., keyboard), a processor, input/output (I/O) interfaces, memory, such as RAM, ROM, NVRAM, and a mass data storage device, such as a hard drive, CD-ROM and/or DVD units. During operation, host 12 includes in its memory a software program including program instructions that function as a printer driver for ink jet printer 14. The printer driver is in communication with controller 24 of ink jet printer 14 via communications link 16. The printer driver, for example, includes a halftoning unit and a data formatter that places print data and print commands in a format that can be recognized by ink jet printer 14. In a network environment, communications between host 12 and ink jet printer 14 may be facilitated via a standard communication protocol, such as the Network Printer Alliance Protocol (NPAP).

Media source 28 is configured to receive a plurality of print media sheets from which an individual print media sheet 31 is picked by sheet picking unit 22 and transported to feed roller unit 20, which in turn further transports print media sheet 31 during a printing operation over mid-frame 26, which provides support for the print media sheet 31. Print media sheet 31 may be, for example, plain paper, coated paper, photo paper or transparency media.

Printhead carrier system 18 includes a printhead carrier 32 for mounting and carrying a color printhead 34 and/or a monochrome printhead 36. A color ink reservoir 38 is provided in fluid communication with color printhead 34, and a monochrome ink reservoir 40 is provided in fluid communication with monochrome printhead 36. Those skilled in the art will recognize that color printhead 34 and color ink reservoir 38 may be formed as individual discrete units, or may be combined as an integral unitary printhead cartridge. Likewise, monochrome printhead 36 and monochrome ink reservoir 40 may be formed as individual discrete units, or may be combined as an integral unitary printhead cartridge.

Printhead carrier 32 is guided by a pair of guide members 42, 44, such as for example, guide rods, which generally define a bi-directional scanning path 46 for printhead carrier 32. Printhead carrier 32 is connected to a carrier transport belt 48 via a carrier drive attachment device 50. Carrier transport belt 48 is driven by a carrier motor 54 via a carrier pulley 56. Carrier motor 54 has a rotating carrier motor shaft 58 that is attached to carrier pulley 56. At the directive of controller 24, printhead carrier 32 is transported in a reciprocating manner along guide members 42, 44. Carrier motor 54 can be, for example, a direct current (DC) motor or a stepper motor.

Feed roller unit 20 includes a feed roller 60, and a drive unit 62. Feed roller 60 is driven by drive unit 62, and pinch rollers (not shown) apply a biasing force to hold the print media sheet 31 in contact with respective driven feed roller 60. Drive unit 62 includes a drive source, such as for example a direct current (DC) motor, and an associated drive mechanism, such as a gear train or belt/pulley arrangement. Feed roller unit 20 feeds the print media sheet 31 in a sheet feed direction 64, designated as an X in a circle to indicate that the sheet feed direction is out of the plane of FIG. 1 toward the reader. The sheet feed direction 64 is commonly referred to as the vertical direction, which is perpendicular to the horizontal bi-directional scanning path 46. Thus, with respect to print media sheet 31, carrier reciprocation occurs in a horizontal direction and media advance occurs in a vertical direction, and the carrier reciprocation is generally perpendicular to the media advance.

Analog encoder unit 30 includes an encoder electronics module 66 and an encoder wheel 68. Encoder wheel 68 is connected to feed roller 60 for simultaneous rotation therewith. Encoder electronics module 66 includes, for example, a light element, such as an LED, and two photo sensors, such as photo diodes, defining A and B output channels of analog encoder unit 30. Encoder electronics module 66 may further include, for example, amplification and offset circuitry, as well as the feedback circuitry in accordance with the present invention. It is contemplated that such amplification, offset, and/or feedback circuitry may be located apart from electronics module 66, such as for example, on a circuit card of ink jet printer 14. Encoder wheel 68 is in the form of a rotary disk including a windowed mask, which is positioned between the light element and photo sensors, which when rotated results in output signals to the present on the A and B channels of analog encoder unit 30.

Controller 24 may be formed as an application specific integrated circuit (ASIC), and includes processing capability, which may be in the form of a microprocessor having an associated random access memory (RAM) and read only memory (ROM). Controller 24 executes program instructions to effect the printing of an image on the print media sheet 31, such as for example, by selecting the index feed distance of print media sheet 31 as conveyed by feed roller 60, controlling the reciprocation of printhead carrier 32, and controlling the operations of printheads 34, 36. In addition, controller 24 executes instructions to effect analog encoder initialization, and thereafter, to communicate with analog encoder unit 30 in controlling the position of feed roller 60.

Controller 24 is electrically connected and communicatively coupled to printheads 34, 36 via a communications link 72, such as for example a printhead interface cable. Controller 24 is electrically connected and communicatively coupled to carrier motor 54 via a communications link 74, such as for example an interface cable. Controller 24 is electrically connected and communicatively coupled to drive unit 62 via a communications link 76, such as for example an interface cable. Controller 24 is electrically connected and communicatively coupled to sheet picking unit 22 via a communications link 78, such as for example an interface cable. Controller 24 is electrically connected and communicatively coupled to analog encoder unit 30 via a communications link 80, such as for example an interface cable.

Figure 2:
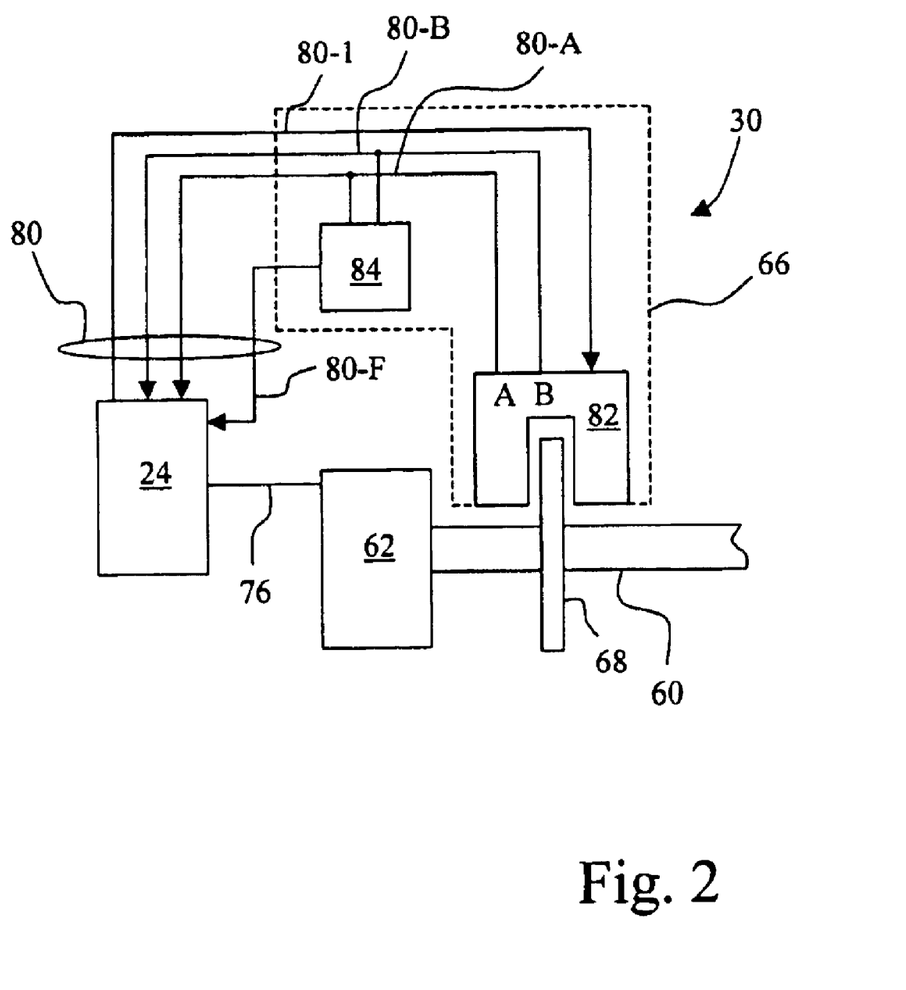
FIG. 2 is a diagrammatic representation of the analog encoder unit included in the imaging system of FIG. 1.

Referring now also to FIG. 2, encoder electronics module 66 of analog encoder unit 30 includes an encoder reading circuit 82 and a feedback circuit 84. Encoder reading circuit 82 includes the aforementioned light element, photo sensors, and normal front-end circuitry, including amplification and offset circuitry. Feedback circuit 84 will be discussed in detail below, with respect to FIGS. 3 and 4. As shown in FIG. 2, communication link 80, which communicatively couples controller 24 with analog encoder unit 30, includes a control line 80-1, signal lines 80-A and 80-B, and a feedback line 80-F.

While in the embodiment shown, feedback circuit 84 is formed as a part of encoder electronics module 66 of analog encoder unit 30, those skilled in the art will recognize that feedback circuit 84 may be formed as a part of controller 24, or may be formed as a separate circuit, while maintaining the function and connectivity described herein.

Controller 24 supplies LED energization signals and DC offset signals to encoder reading circuit 82 via control line 80-1. Encoder reading circuit 82 supplies a channel A output signal from an output channel A to both controller 24 and to feedback circuit 84, in parallel, via signal line 80-A. Likewise, encoder reading circuit 82 supplies a channel B output signal from an output channel B to both controller 24 and to feedback circuit 84, in parallel, via signal line 80-B. Based on the channel A and channel B output signals received from channels A and B, respectively, of encoder reading circuit 82, feedback circuit 84 generates a feedback signal that is supplied to controller 24 via feedback line 80-F. By incorporating feedback circuit 84 into analog encoder unit 30, closed loop feed roller velocity control is facilitated during encoder initialization of analog encoder unit 30, in accordance with the present invention.

Figure 3:
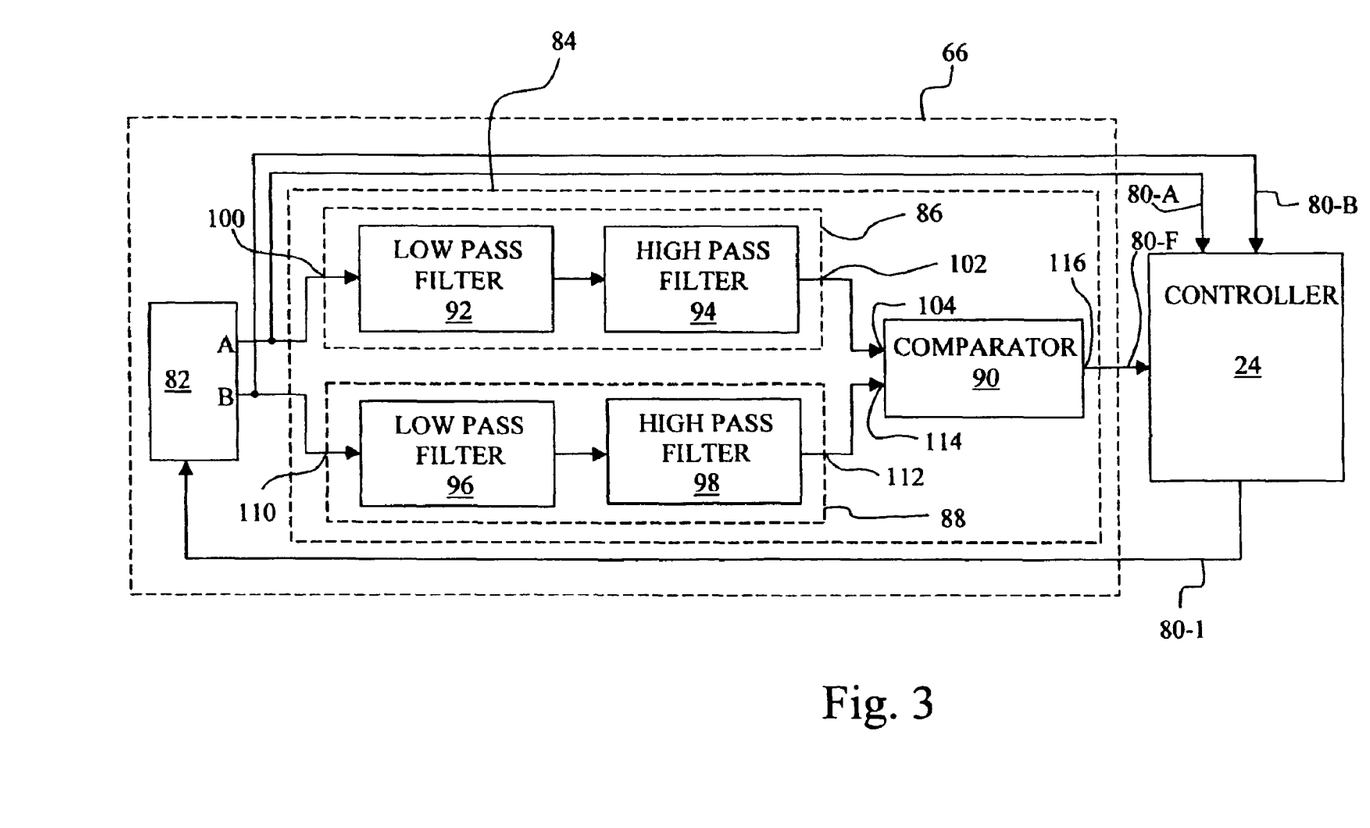
FIG. 3 is a more detailed diagrammatic representation of an encoder electronics module of the analog encoder unit of FIG. 2.

Referring to FIG. 3, there is shown an embodiment of feedback circuit 84 of encoder electronics module 66 of analog encoder unit 30. Feedback circuit 84 includes an A-channel band pass filter 86, a B-channel band pass filter 88 and a comparator 90. A-channel band pass filter 86 includes a low pass filter 92 and a high pass filter 94. B-channel band pass filter 88 includes a low pass filter 96 and a high pass filter 98. Band pass filters 86, 88 may be designed, for example, to pass a band of signal frequencies, for example, in a frequency range of about 50 hertz (Hz) to about 5 kHz, which in turn is used by controller 24 to control a rotational velocity of feed roller 60.

An input 100 of A-channel band pass filter 86 is electrically coupled to channel A of encoder reading circuit 82. An output 102 of A-channel band pass filter 86 is electrically coupled to an input 104 of comparator 90. An input 110 of B-channel band pass filter 88 is electrically coupled to channel B of encoder reading circuit 82. An output 112 of B-channel band pass filter 88 is electrically coupled to an input 114 of comparator 90. An output 116 of comparator 90 is electrically coupled to controller 24 via feedback line 80-F, and in turn supplies digital feedback signals to controller 24 for use in providing feed roller velocity control during the initialization of analog encoder unit 30. Thus, with the present invention, the very signals (channel A and channel B encoder signals) generated by encoder reading circuit 82 are supplied to feedback circuit 84 and processed to provide a digital feedback signal to controller 24 in implementing closed loop feed roller velocity control in accordance with the present invention. Variations in the frequency of the digital feedback signal present at output 116 are used by controller 24 to control the rotational velocity of feed roller 60, during initialization of analog encoder 30, to a desired velocity. A suitable target velocity may be, for example, a velocity selected from a range of one inch per second to three inches per second.

Low-pass filters 92, 96 block high frequencies associated with rapid changes in the channel A signal received at input 100 of A-channel band pass filter 86 and the channel B signal received at input 110 of B-channel band pass filter 88, respectively. Such high frequencies may occur, for example, due to rapid changes in the DC offset pulse width modulated (PWM) signals supplied by controller 24 to analog encoder unit 30 or due to high frequency noise that may get coupled onto encoder signal lines 80-A and 80-B.

Further, the DC offsets associated with the channel A signal received at input 100 of A-channel band pass filter 86 and the channel B signal received at input 110 of B-channel band pass filter 88 may vary widely. Accordingly, these DC offsets are removed by high pass filters 94, 98, and thus, the channel A signal and the channel B signal are each centered around a common, fixed DC voltage. At this point, the two resulting filtered encoder signals are fed into the inputs of comparator 90. This results in a square wave digital output signal at output 116 of comparator 90, which in turn is received by controller 24. A benefit of this implementation is that the integrity of the generated feedback signal is maintained, even with an encoder signal on either channel alone, so long as at least one of the channel A signal and the channel B signal is functional, e.g., having a signal amplitude larger than a couple of tenths of a volt.

Each of band pass filters 86, 88 may be a passive filter, i.e., formed from passive components, e.g., resistors and capacitors; may be an active filter, i.e., including one or more operational amplifiers; or may be a combination of passive and active filters. Further, each of low pass filters 92, 96 and high pass filters 94, 98 (respectively forming band pass filters 86, 88) may be single stage or multi-stage filters.

Figure 4:
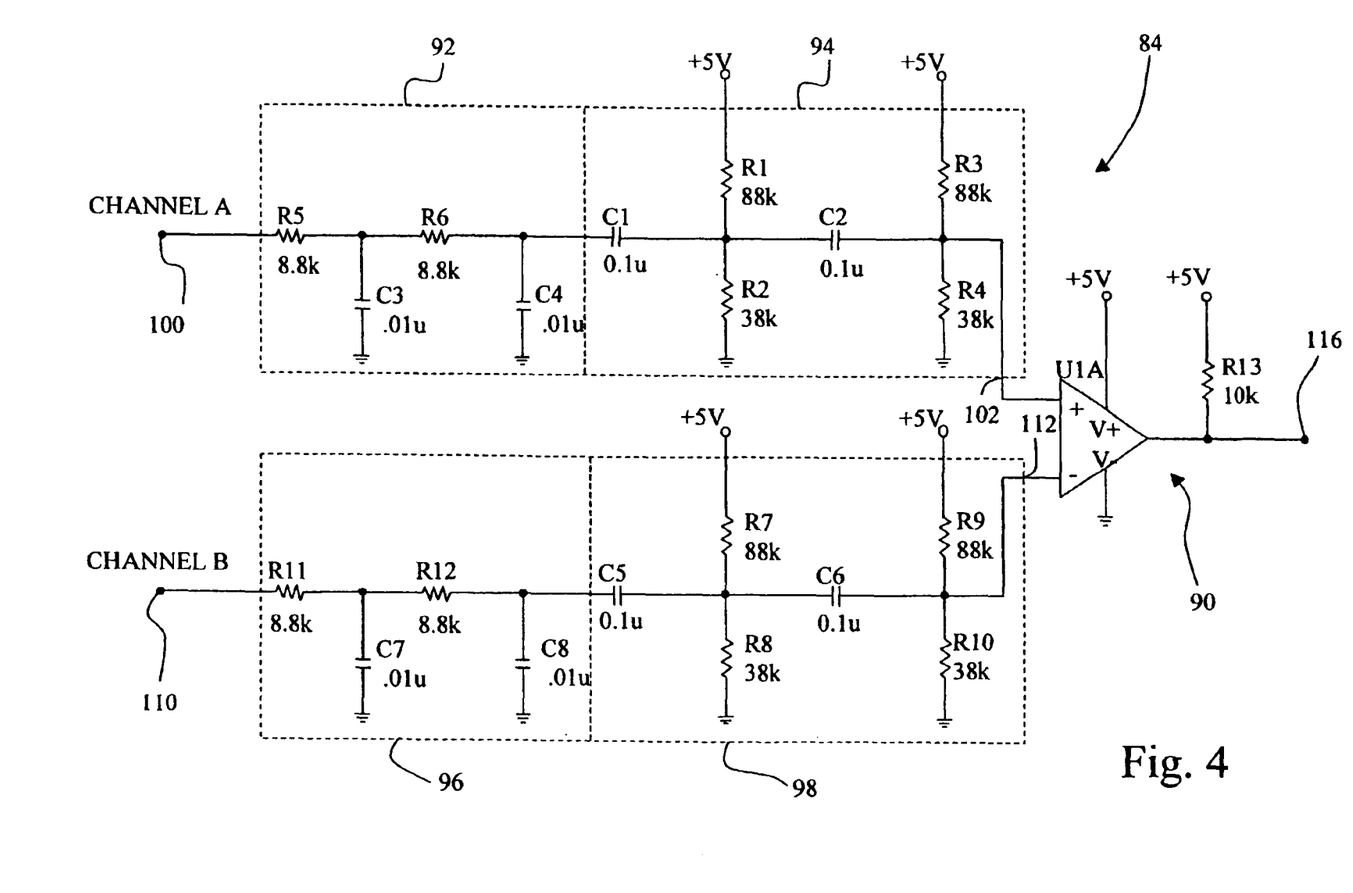
FIG. 4 is a circuit schematic of a feedback circuit suitable for use in the analog encoder unit of FIG. 2.

FIG. 4 is a circuit schematic of one embodiment of feedback circuit 84, which utilizes two-stage passive filters for each of low pass filters 92, 96 and high pass filters 94, 98. The resistor and capacitor values shown are exemplary, and provide a band pass frequency range of about 60 Hz to about 1.8 kHz. Low pass filter 92 is configured with resistors R5, R6 and capacitors C3, C4. High pass filter 94 is configured with resistors R1, R2, R3, R4, and capacitors C1, C2. Resistor pairs R1, R2 and R3, R4 of high pass filter 94 each form a voltage divider to provide the filtered signal with a DC-offset, which in turn is supplied to comparator 90.

Low pass filter 96 is configured with resistors R11, R12 and capacitors C7, C8. High pass filter 98 is configured with resistors R7, R8, R9, R10, and capacitors C5, C6. Resistor pairs R7, R8 and R9, R10 of high pass filter 98 each form a voltage divider to provide the filtered signal with a DC-offset, which in turn is supplied to comparator 90.

Comparator 90 includes a comparator device U1A, with a pull-up resistor R13 located at its output.

Figure 5:
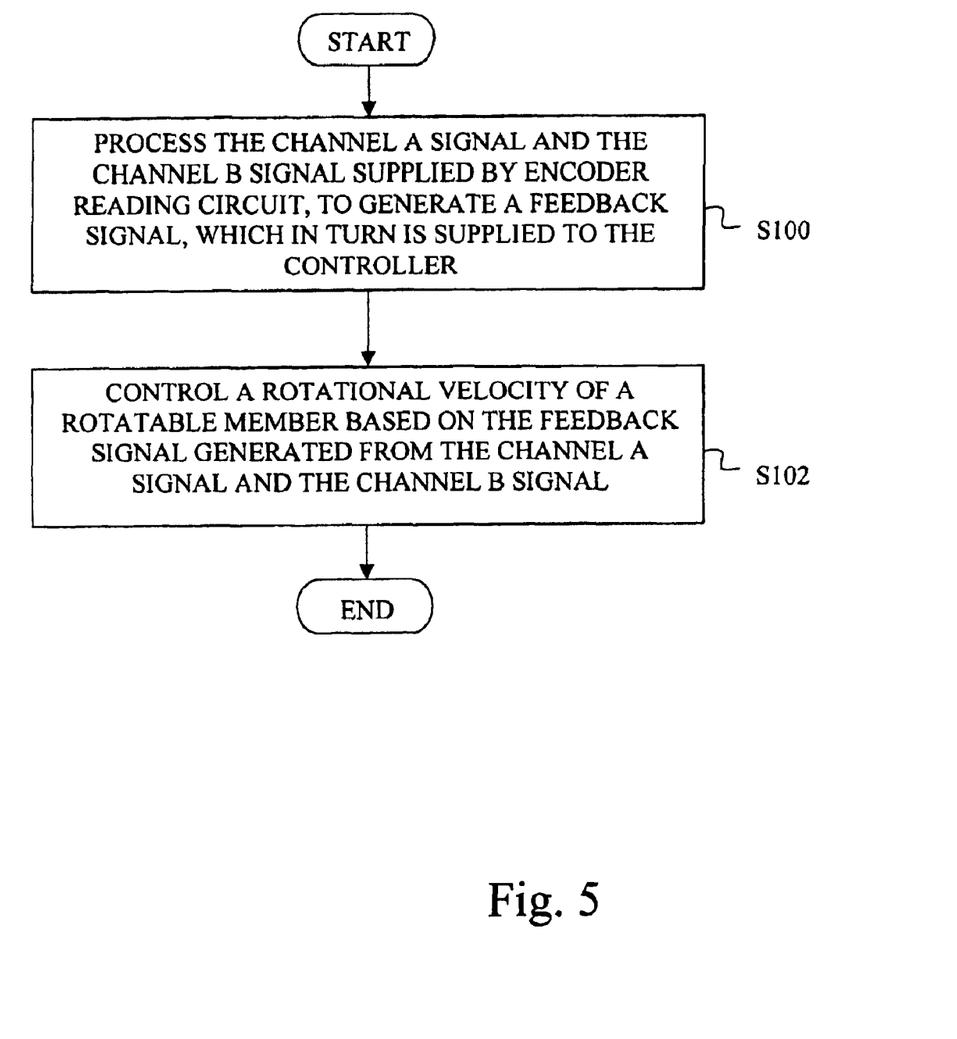
FIG. 5 is a flowchart showing the general steps of a method of controlling a rotational velocity of a rotatable member during initialization of the analog encoder unit.

FIG. 5 is a flowchart showing the general steps of a method of controlling a rotational velocity of a rotatable member, such as for example feed roller 60 or encoder wheel 68, or an associated motor shaft or pulley of drive unit 62, during initialization of an analog encoder, such as analog encoder unit 30, that generates a channel A signal and a channel B signal.

At step S100, feedback circuit 84 of analog encoder unit 30 processes the channel A signal and the channel B signal supplied by encoder reading circuit 82, to generate a feedback signal, which in turn is supplied to controller 24. Feedback circuit 84 is configured to generate a usable feedback signal, i.e., the integrity of the feedback signal is maintained, even if only one of the channel A signal and the channel B signal is functional, i.e., is present at a usable level.

At step S102, controller 24 controls a rotational velocity of a rotatable member based on the feedback signal supplied by feedback circuit 84, which was generated from the channel A signal and the channel B signal. For example, controller 24 may use the variation in signal frequency of the feedback signal in adjusting the rotational velocity of feed roller 60 to a desired velocity, during the initialization of analog encoder unit 30.

Figure 6:
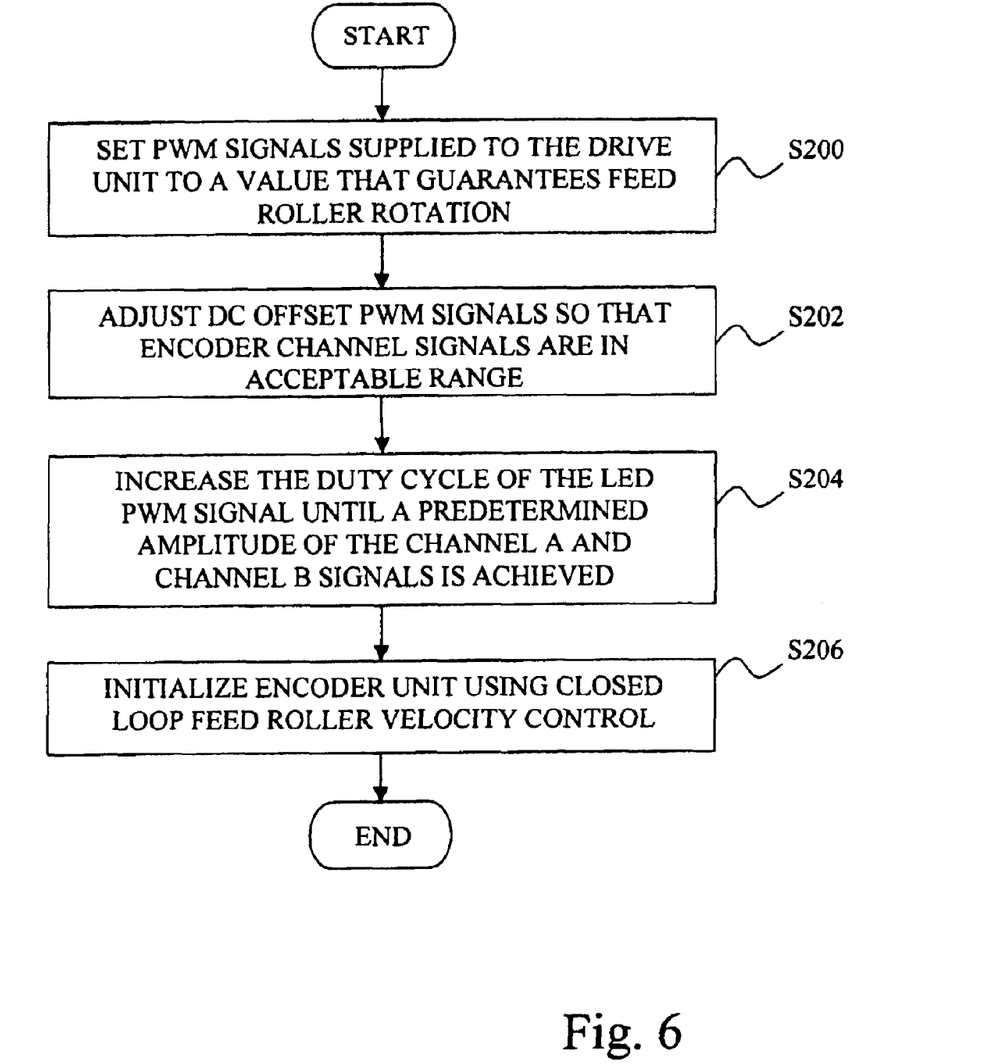
FIG. 6 is a flow chart of a pre-initialization procedure, suitable for use prior to initiating the method depicted in FIG. 5.

In order for feedback circuit 84 to provide acceptable feedback, it is desirable that the channel A and the channel B signals supplied by encoder reading circuit 82 satisfy two criteria: (1) at least one of the signals have a non-zero peak-to-peak amplitude, and (2) the signals are within range, i.e., not "railed out". Accordingly, a simple pre-initialization procedure, as depicted in the flowchart of FIG. 6, may be used to ensure this. Once the channel A and channel B encoder signals are acceptable, then the closed loop velocity control in accordance with the present invention may be activated.

Referring to FIG. 6, at step S200 the pulse width modulation (PWM) signals supplied from controller 24 to drive unit 62, including the feed roller DC motor, is set to a value that will guarantee rotation of feed roller 60.

At step S202, controller 24 adjusts the DC offset PWM signals supplied to the light sensors of analog encoder unit 30 to ensure that the channel A and channel B encoder signals of analog encoder unit 30 are within an acceptable range, i.e., are at a detectable level, and are not railed out.

At step S204, beginning at an initial level, such as for example, a duty cycle of zero, controller 24 increases the duty cycle of the LED PWM signals supplied to the light source of analog encoder unit 30 until a predetermined amplitude of the channel A and channel B encoder signals is achieved.

At step S206, initialization of analog encoder unit 30 is performed using the closed loop feed roller velocity control in accordance with the present invention.

If desired, a safeguard that can be implemented to monitor the closed loop velocity control to check for possible open loop conditions resulting from unacceptable encoder signals. This is an unlikely situation, but if such an event is detected (e.g., high motor PWM) the initialization routine could continue in an open loop mode.

If the direction of rotation of feed roller 60 is not predefined, as was assumed above, those skilled in the art will recognize that the feedback circuit 84 of FIGS. 3 and 4 may be modified to generate two quadrature digital signals, by routing the channel A signal and the channel B signal, after high-pass filters 94, 98, into separate comparators, or alternatively, Schmidt triggers. A DC signal equal to the DC level of the channel A signal and the channel B signal may then be applied to the other inputs of the respective comparators. This would generate quadrature digital signals that could then be used to determine both feed roller direction and velocity.

While this invention has been described with respect to embodiments of the invention, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of controlling a rotational velocity of a rotatable member during initialization of an analog encoder unit that generates a channel A signal and a channel B signal, comprising the steps of:

processing said channel A signal and said channel B signal to generate a feedback signal, an integrity of said feedback signal being maintained even if only one of said channel A signal and said channel B signal is functional; and controlling said rotational velocity of said rotatable member during said initialization of said analog encoder unit based on said feedback signal generated by processing said channel A signal and said channel B signal.

2. The method of claim 1, wherein said rotational velocity of said rotatable member is controlled based on a frequency of said feedback signal.

3. The method of claim 1, wherein said processing is performed by passing each of said channel A signal and said channel B signal through a respective high pass filter.

4. The method of claim 1, wherein said processing is performed by passing each of said channel A signal and said channel B signal through a respective band pass filter.

5. The method of claim 4, wherein said band pass filter passes frequencies in a range of about 50 Hz to about 5 kHz.

6. A closed loop feedback system that controls a rotational velocity of a rotatable member driven by a drive unit during initialization of an analog encoder unit, comprising:
   an encoder reading circuit forming part of said analog encoder unit, said encoder reading circuit being configured to generate a channel A signal and a channel B signal;
   a feedback circuit coupled to said encoder reading circuit to receive said channel A signal and said channel B signal, said feedback circuit processing said channel A signal and said channel B signal to generate a feedback signal; and
   a controller coupled to said drive unit and to said feedback circuit, said controller controlling said rotational velocity of said rotatable member via said drive unit during said initialization of said analog encoder unit based on said feedback signal generated from said channel A signal and said channel B signal.

7. The closed loop feedback system of claim 6, wherein said controller controls said rotational velocity of said rotatable member during said initialization of said analog encoder unit based on a frequency of said feedback signal.

8. The closed loop feedback system of claim 6, said feedback circuit including:
   a first high pass filter for processing said channel A signal;
   a second high pass filter for processing said channel B signal; and
   a comparator having inputs coupled to said first high pass filter and said second high pass filter, and having an output providing said feedback signal.

9. The closed loop feedback system of claim 8, each of said first high pass filter and said second high pass filter including a respective DC offset circuit.

10. The closed loop feedback system of claim 6, said feedback circuit including:
    a first band pass filter for processing said channel A signal;
    a second band pass filter for processing said channel B signal; and
    a comparator having inputs coupled to said first band pass filter and said second band pass filter, and having an output providing said feedback signal.

11. The closed loop feedback system of claim 10, wherein each of said first band pass filter and said second band pass filter passes frequencies in a range of about 50 Hz to about 5 kHz.

12. An apparatus that controls a rotational velocity of a feed roller during initialization of an analog encoder unit, comprising:
    a feed roller unit including said feed roller and a feed roller drive unit;
    an encoder wheel forming part of said analog encoder unit, said encoder wheel being connected to said feed roller for rotation with said feed roller;
    an encoder reading circuit forming part of said analog encoder unit, said encoder reading circuit being positioned to read said encoder wheel to generate a channel A signal and a channel B signal;
    a feedback circuit coupled to said encoder reading circuit to receive said channel A signal and said channel B signal, said feedback circuit processing said channel A signal and said channel B signal to generate a feedback signal; and
    a controller coupled to each of said feed roller drive unit, said encoder reading circuit, and said feedback circuit, said controller controlling said rotational velocity of said feed roller via said feed roller drive unit during said initialization of said analog encoder unit based on said feedback signal generated from said channel A signal and said channel B signal.

13. The apparatus of claim 12, wherein said controller controls said rotational velocity of said feed roller during said initialization of said analog encoder unit based on a frequency of said feedback signal.

14. The apparatus of claim 12, said feedback circuit including:
    a first high pass filter for processing said channel A signal;
    a second high pass filter for processing said channel B signal; and
    a comparator having inputs coupled to said first high pass filter and said second high pass filter, and having an output providing said feedback signal.

15. The apparatus of claim 14, each of said first high pass filter and said second high pass filter including a respective DC offset circuit.

16. The apparatus of claim 12, said feedback circuit including:
    a first band pass filter for processing said channel A signal;
    a second band pass filter for processing said channel B signal; and
    a comparator having inputs coupled to said first band pass filter and said second band pass filter, and having an output providing said feedback signal.

17. The apparatus of claim 16, wherein each of said first band pass filter and said second band pass filter passes frequencies in a range of about 50 Hz to about 5 kHz.

18. The apparatus of claim 12, said controller being configured to perform the preliminary steps of:
    supplying a pulse width modulation output signal to said feed roller drive unit at a value that will guarantee rotation of said feed roller;
    supplying a DC offset PWM signal to said analog encoder unit;
    adjusting said DC offset PWM signal to ensure that said channel A signal and said channel B signal are each within an acceptable range;
    supplying an LED PWM signal to said analog encoder unit; and
    beginning at an initial level, increasing a duty cycle of said LED PWM signal supplied to said analog encoder unit to achieve a predetermined amplitude of said channel A signal and said channel B signal.

* * * * *